March 4, 1930.  L. W. WITRY  1,749,202
TRACTOR
Original Filed Dec. 24, 1923  3 Sheets-Sheet 3
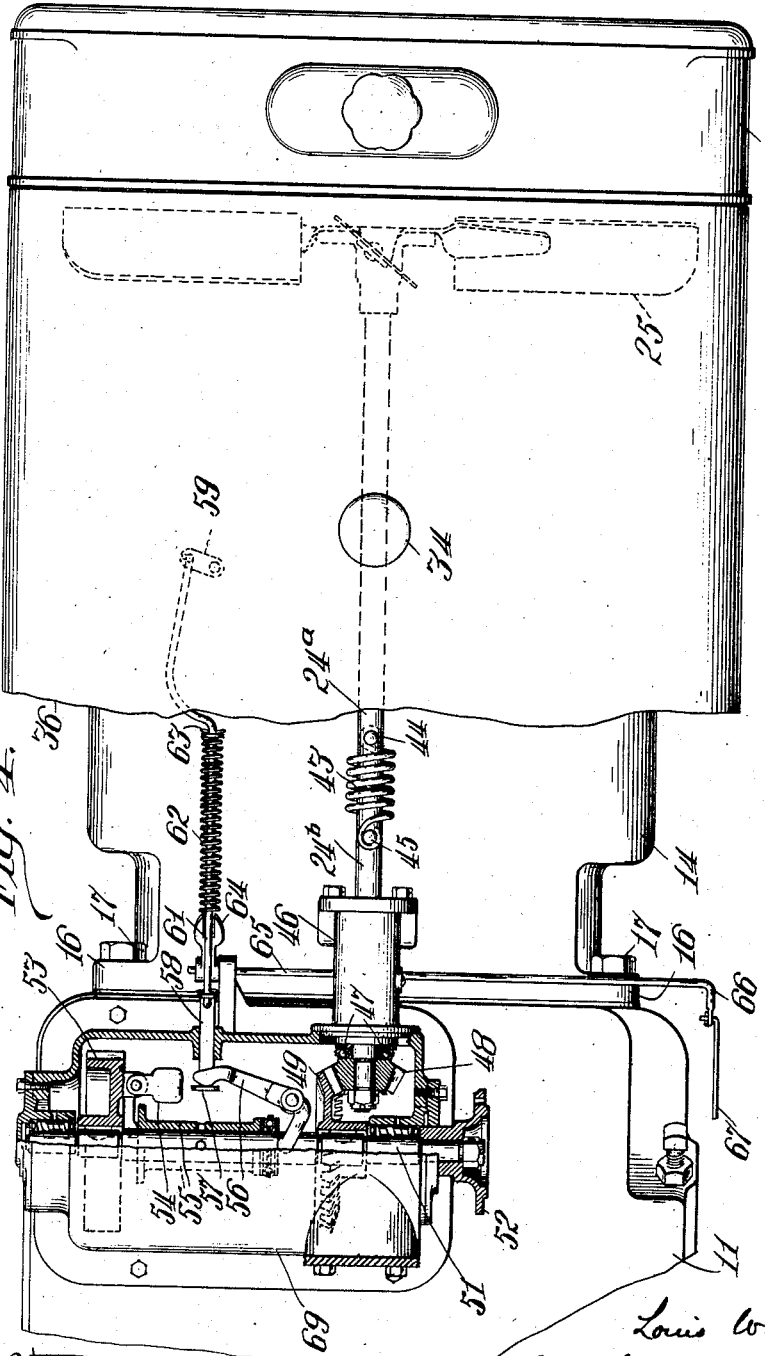
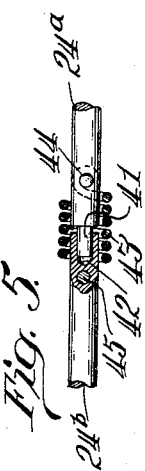
Inventor.
Louis W. Witry,
Attorneys Patented Mar. 4, 1930

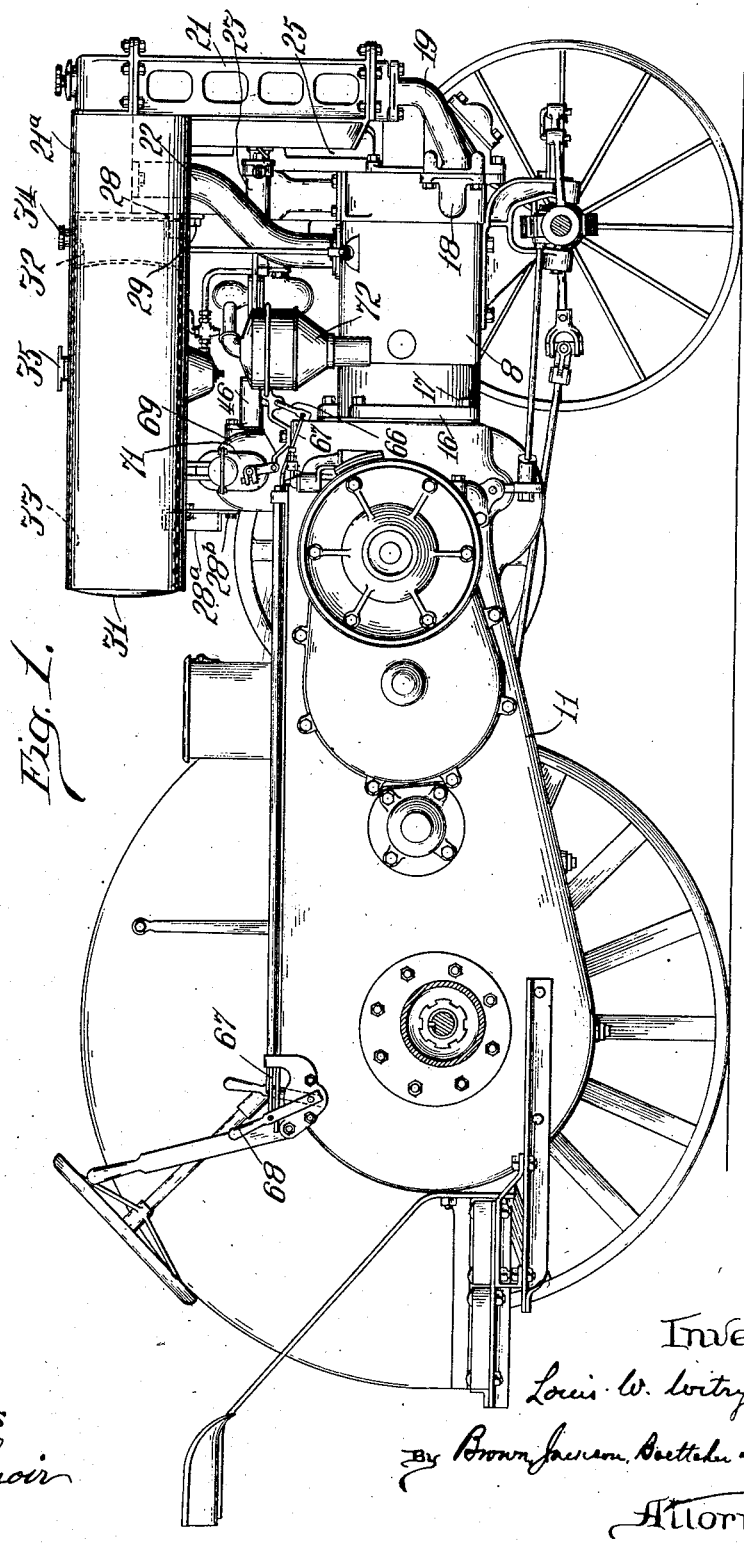

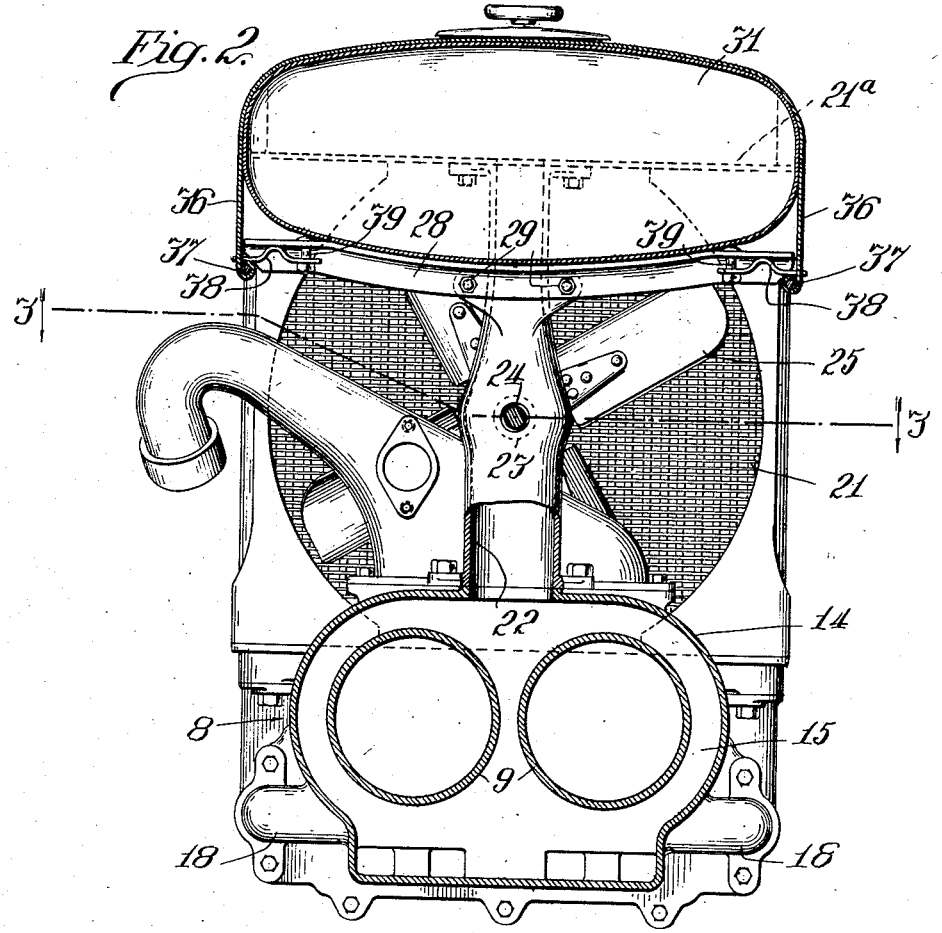
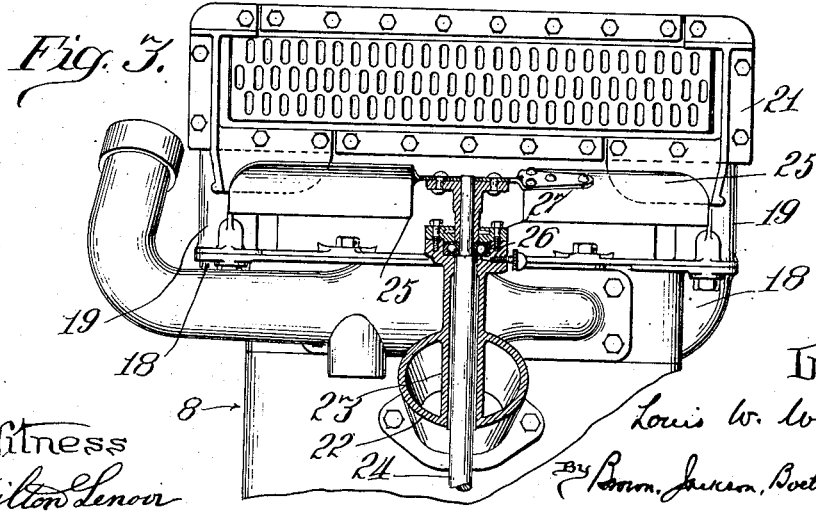

1,749,202

UNITED STATES PATENT OFFICE

LOUIS W. WITRY, OF WATERLOO, IOWA, ASSIGNOR TO JOHN DEERE TRACTOR COMPANY, OF WATERLOO, IOWA, A CORPORATION OF IOWA

TRACTOR

Original application filed December 24, 1923, Serial No. 682,401. Divided and this application filed January 25, 1928. Serial No. 249,366.

This application is divisional of my copending application, Serial No. 682,401, filed December 24, 1923, directed to improvements in tractors such as are ordinarily used for farming operations. The present invention has particular reference to the internal combustion engine power plant of the tractor, and to the cooling system and other related apparatus associated with the engine, having for its general object to provide certain improvements by which efficient circulation of the water through the radiator and water jackets of the cylinders will be maintained; by which the proper operation of the fan will be provided for to the end of avoiding breakage of the fan or its driving parts through inertia shock; by which a conduit of the cooling system is utilized to support the fuel tank and fan shaft; and by which the power plant portion of the tractor will be simplified and cheapened without detracting from its efficiency or strength. I accomplish this object as illustrated in the accompanying drawings and as hereinafter described. In the drawings;

Fig. 1 is a side elevational view of the tractor, the wheels on the near side thereof being broken away;

Fig. 2 is a vertical cross-sectional view through the forward portion of the cylinder block and fuel tank, showing the radiator, the fan and other associated parts;

Fig. 3 is a partial horizontal sectional view on line 3—3 of Fig. 2;

Fig. 4 is a plan view, partly in elevation and partly in section, illustrating the devices for driving the fan and also the governor mechanism; and Fig. 5 is a detail view, partly in section, illustrating the construction of the jointed fan driving shaft.

It will be noted from Fig. 1 that the internal combustion engine 8 is disposed at the front end of the tractor. Such engine is of the two cylinder horizontal type, preferably designed to burn kerosene, or equivalent hydro-carbon, but to be started on gasoline. The two cylinders 9 are disposed side by side longitudinally of the tractor with the crank shaft extending transversely thereof. Power is transmitted from the crank shaft to the rear traction wheels through a suitable arrangement of clutch, transmission mechanism and differential, which need not be described as they form no part of the present invention. The transmission mechanism and differential are enclosed in a housing 11 which constitutes the rear frame portion of the tractor. The cylinder block of the engine 8 is bolted to the front end of the housing 11 and constitutes the front frame portion of the tractor.

As shown in Fig. 2, the cylinders 9 are surrounded by a casing 14 which provides a chamber 15 through which water circulates around the cylinders 9, thus forming a water jacket for said cylinders. The rear end of said casing is provided with flanges 16, as shown in Fig. 4, by which the cylinder block is bolted to the housing 11, as indicated at 17. Communicating with the lower front corners of the chamber 15 are elbows 18, which are connected by pipes 19 with the opposite lower corners of a radiator 21 of any suitable type placed at the front of the tractor. The purpose of this arrangement is to permit the cool water from the radiator to pass downward at both sides and back to opposite sides of the water jacket or chamber 15. The upper portion of said chamber is connected with the upper portion of the radiator 21 by a tubular standard 22, shown in Figs. 2 and 3, which rises from the upper central portion of the casing 14 and opens into a rearward extension 21ª of the upper portion of the radiator, as indicated by dotted lines in Fig. 1 so that said standard serves to support the radiator. By this means the hot water in the chamber 15 rises through the standard 22 and is delivered to the upper portion of the radiator, whence it passes down through the radiator and after being cooled by the air passing therethrough returns to the chamber 15 through the pipes 19. By providing two outlets from the radiator to the water jacket, the circulation of the water is improved, and it is caused to spread out more in passing through the radiator so that less radiation surface is necessary to properly reduce the temperature of the water. Furthermore, as the exhaust valves are at the forward ends of the cylinders and the water returning from the radiator is delivered to the chamber 15 adjacent to such valves, which are the hottest points of the cylinders, the cooling system operates with the greatest efficiency. The pipes 19 serve also to support the radiator.

In addition to providing a conduit for the return of water from the water jacket to the radiator, the standard 22 serves also as a support for the fuel tank and for the fan shaft. As best shown in Figs. 2 and 3, said standard is provided with a sleeve 23 that extends fore and aft therethrough and for a short distance forward therefrom, said sleeve being preferably formed integral with said standard so that water flowing through the standard cannot escape around said sleeve. Through this sleeve extends the fan shaft 24, on the forward end of which is mounted the usual fan 25 disposed back of and adjacent to the radiator. Preferably an anti-friction bearing 26 is provided for said shaft at the forward end of said sleeve, which bearing is held in place by a bolted cover plate 27 shown in Fig. 3. The construction of the fan shaft and the mechanism for driving it will be hereinafter explained.

As best shown in Fig. 2, the standard 22 is provided near its upper end with a transversely-disposed bar 28 rigidly secured thereto, as by bolts 29, which bar closely underlies and forms a front support for a fuel tank 31, the forward end of which is adjacent to the radiator 21, as best shown in Fig. 1. This fuel tank extends rearwardly over the engine and its equipment, and it is divided into a small front chamber 32 designed to hold gasoline, and a larger rear chamber 33 for kerosene. The rear portion of the fuel tank rests on an angle iron cross-bar 28ª secured intermediately to a shoulder or boss 28ᵇ on the casing of the governor hereinafter referred to. The chambers 32, 33 are respectively provided with filler openings 34, 35. The fuel tank is secured in place on the crossbar 28 by means of a jacket 36, best shown in Fig. 2, which extends over said tank and is secured at its side margins to the crossbars 28, 28ª. As best shown in said figure, the side margins of said jacket are provided with rods or beads 37 which are engaged by the outer ends of rocker plates 38 fulcrumed on the cross-bars 28, 28ª, and secured thereto at their inner ends by bolts 39. The arrangement is such that the bolts draw the inner ends of said rocker plates upward, and consequently force their outer ends downward so that the side margins of the jacket 36 are drawn downward, thereby tightly binding the fuel tank on the supporting bars 28, 28ª. By this means the fuel tank is held tightly so that it cannot work loose under the jolting of the tractor, and yet it may easily be removed when necessary.

It will be observed that the standard 22 not only supports the upper part of the radiator 21 and its extension 21ª, but also supports the forward portion of the fuel tank and furnishes a bearing support for the fan shaft, and at the same time provides a conduit for the flow or delivery of the water to the radiator, thereby greatly simplifying the construction of the machine and reducing the cost of manufacture, as well as economizing space so as to leave plenty of room around the motor so that it is conveniently accessible for the purpose of making adjustments, etc., which is a very desirable feature.

The construction of the fan shaft 24 is best shown in Figs. 4 and 5, and particularly in the latter figure, from an inspection of which it will be seen that it is composed of two members 24ª, 24ᵇ connected by a flexible connection formed by providing one of said members, as 24ª, with a pin 41, and the other with a socket 42 adapted to receive said pin loosely enough to permit the members 24ª, 24ᵇ to assume an angular position relatively to each other to a limited extent. Said members are also connected by a spring 43, one end of which is connected with the member 24ª by a pin 44, its other end being connected to the member 24ᵇ by a pin 45. The member 24ᵇ is rotated by mechanism that will be hereinafter described, and the torque is transmitted to the member 24ª and the fan by the spring 43. By this construction the fan shaft accommodates itself to any inaccuracy in alinement of the bearings of the members 24ª, 24ᵇ, and therefore permits considerable leeway in manufacture, thereby reducing costs. Also, the spring acts as a cushion and absorbs the shocks of starting, while at the same time a positive drive of the fan is obtained. Obviously, when the engine is started, the inertia of the fan must be overcome, and if the drive connections of the fan are unyielding the ensuing shock is apt to snap the blades of the fan or break the teeth out of the fan drive gears, where such gears are employed, and by my improved construction this danger is avoided, since the spring absorbs the starting shock and causes the fan to start easily. I am thus able to use gears for driving the fan without danger.

The member 24ᵇ of the fan shaft is mounted in a sleeve 46, shown in Fig. 4, through which it extends, and at the rear end of said sleeve is an anti-friction bearing 47. Mounted on the rear end of the member 24ᵇ is a bevel pinion 48 which meshes with and is driven by a gear 49 mounted on a shaft 51, as shown in Fig. 4, which operates the governor and also drives the magneto. While the governor and magneto driving devices are not included in the subject matter of this application, it may be explained in passing that the shaft 51 carries a coupling member 52 through which it is coupled to the magneto, and it also carries a disc or gear 53 to which are attached centrifugally actuated bell-cranks 54 which act to move a sleeve 55 longitudinally of the shaft 51 to control the position of a bell-crank lever 56. This lever engages a head 57 at the rear end of an endwise movable shaft 58 connected to a throttle 59 by a rod 61. On this rod is a spring 62, the forward end of which bears against a pin 63 carried by said rod, while its other end bears against an arm 64 carried by a transversely-disposed rock shaft 65, at one end of which is a crank 66 connected by a rod 67 with the usual throttle lever 68 shown in Fig. 1. The arrangement is such that increasing speed of the engine tends to move the sleeve 55 toward the bell-crank lever 56, thereby rocking said lever so as to move the shaft 58 to the left as viewed in Fig. 4, which movement tends to close the throttle and puts the spring 62 under greater tension. Slowing down of the engine permits the sleeve 55 to move in the opposite direction, whereupon the spring 62 tends to open the throttle.

The shaft 51 is driven from the crank shaft through the gear 53, but as any suitable means may be used for that purpose, it is believed to be unnecessary to illustrate or describe this subject matter in detail. The assembly of the several parts last described is shown in Fig. 1, in which 69 indicates a casing which encloses the governor mechanism and also the drive gears by which the fan shaft is driven, and 71 indicates the magneto. The part 72 shown in said figure is an air cleaner through which air supplied to the mixing chamber is cleansed from dust.

I claim:

1. The combination with an internal combustion motor, a radiator, and a fan for drawing air through said radiator, of means for driving said fan from said motor comprising relatively long shaft members journaled at their outer ends and loosely coupled together at their inner ends, one of said shaft members being connected with the fan and the other being positively driven by the motor, and a spring coupling the inner ends of said shaft members together for transmitting starting torque from one of said shaft members to the other.

2. The combination with an internal combustion motor, a radiator, and a fan for drawing air through said radiator, of means for driving said fan from said motor comprising relatively long shaft members journaled at their outer ends only and loosely coupled together at their inner ends, one of said shaft members being connected with the fan and the other being positively driven by the motor, and a spring mounted on said shaft members at their juncture and having its end portions connected to said members respectively whereby driving torque is transmitted from one of said shaft members to the other.

3. The combination with an internal combustion motor, a radiator, and a fan for drawing air through said radiator, of means for driving said fan from said motor comprising relatively long shaft members journaled at their outer ends only and coupled together at their inner ends and movable angularly relatively to each other, one of said shaft members being connected with the fan and the other being positively driven by said motor, and a spring operatively connecting said shafts together for transmitting torque from the latter shaft member to the former.

4. In a tractor, the combination with an internal combustion motor of the horizontal type comprising a cylinder, a casing surrounding said cylinder and forming a water jacket therefor, and a piston operating in said cylinder, of a radiator, a standard rising from said water jacket and supporting the upper portion of said radiator, a passage through said standard connecting said water jacket with the upper portion of the radiator, and means connecting the lower portion of said radiator with said water jacket.

5. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, means connecting the lower portion of the radiator with said water jacket, a fuel tank extending rearwardly from said radiator, and means carried by said standard for supporting said fuel tank.

6. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, means connecting the lower portion of the radiator with said water jacket, a fuel tank extending rearwardly from said radiator, a cross-bar secured to said standard and supporting said fuel tank, and means for securing said fuel tank on said cross-bar.

7. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, means connecting the lower portion of the radiator with said water jacket, a fuel tank extending rearwardly from said radiator, a cross-bar secured to said standard and supporting said fuel tank, a jacket extending over the fuel tank, and rocker plates bearing on said cross-bar and engaging the end portions of said jacket for binding the fuel tank on said cross-bar.

8. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, means connecting the lower portion of the radiator with said water jacket, a fan associated with said radiator, and a shaft on which said fan is mounted, said shaft extending through and having a bearing carried by said standard.

9. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, and separate ducts connected with the lower outer portions of the radiator and with said water jacket.

10. In a tractor, the combination with an internal combustion motor of the horizontal type comprising a cylinder, a casing surrounding said cylinder and forming a water jacket therefor, and a piston operating in said cylinder, of a radiator, a standard rising from the water jacket and having a passage therethrough connecting said water jacket with the upper portion of the radiator, and pipes connected with the lower outer portions of the radiator and with said water jacket for supporting said radiator and conducting water therefrom to said water jacket.

11. The combination with an internal combustion motor, a radiator, a fan for drawing air through said radiator, means for driving said fan comprising relatively long shaft members extending substantially the entire length of said motor, bearing members carried by the motor in which the outer ends only of the said shafts are journaled, the inner ends of said shaft members being loosely coupled together and movable angularly relatively to each other, one of the shaft members being connected with the fan and the other being positively driven by said motor, and a spring for transmitting torque from the latter shaft member to the former.

12. The combination with an internal combustion motor, a fan driving shaft comprising two cooperating shaft sections extending substantially the entire length of the motor above the motor cylinders thereof, bearings adjacent the outer ends of the motor in which said shaft sections are journaled, spring means operatively connecting said shaft sections together at their juncture and intermediate of said bearings, one of said shaft sections being connected with the fan and the other being positively driven by the motor.

In witness whereof, I hereunto subscribe my name this 19th day of January, 1928.

LOUIS W. WITRY.